Figure 1:
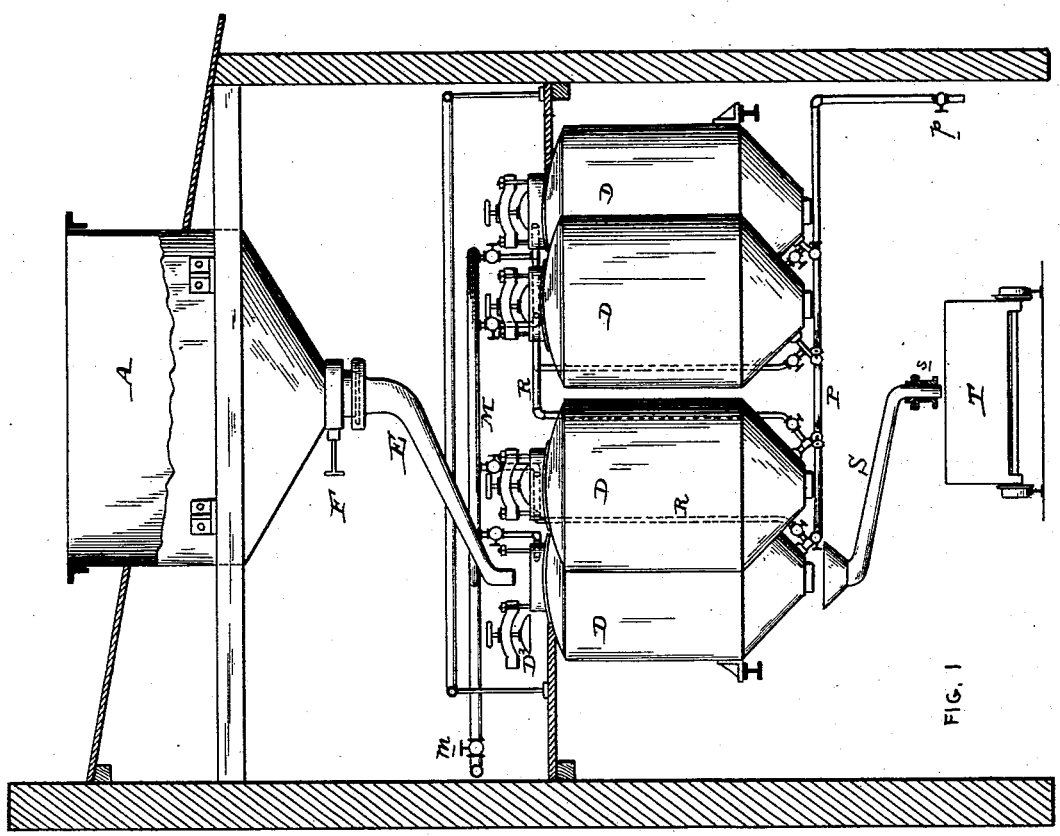

(No Model.)

L. D. ARMSTRONG, Dec'd.
M. M. Armstrong, Administrator.
APPARATUS FOR LEACHING.

No. 570,861. Patented Nov. 3, 1896.

2 Sheets—Sheet 1.

Witnesses:

Inventor:
Lewis D. Armstrong
By his atty

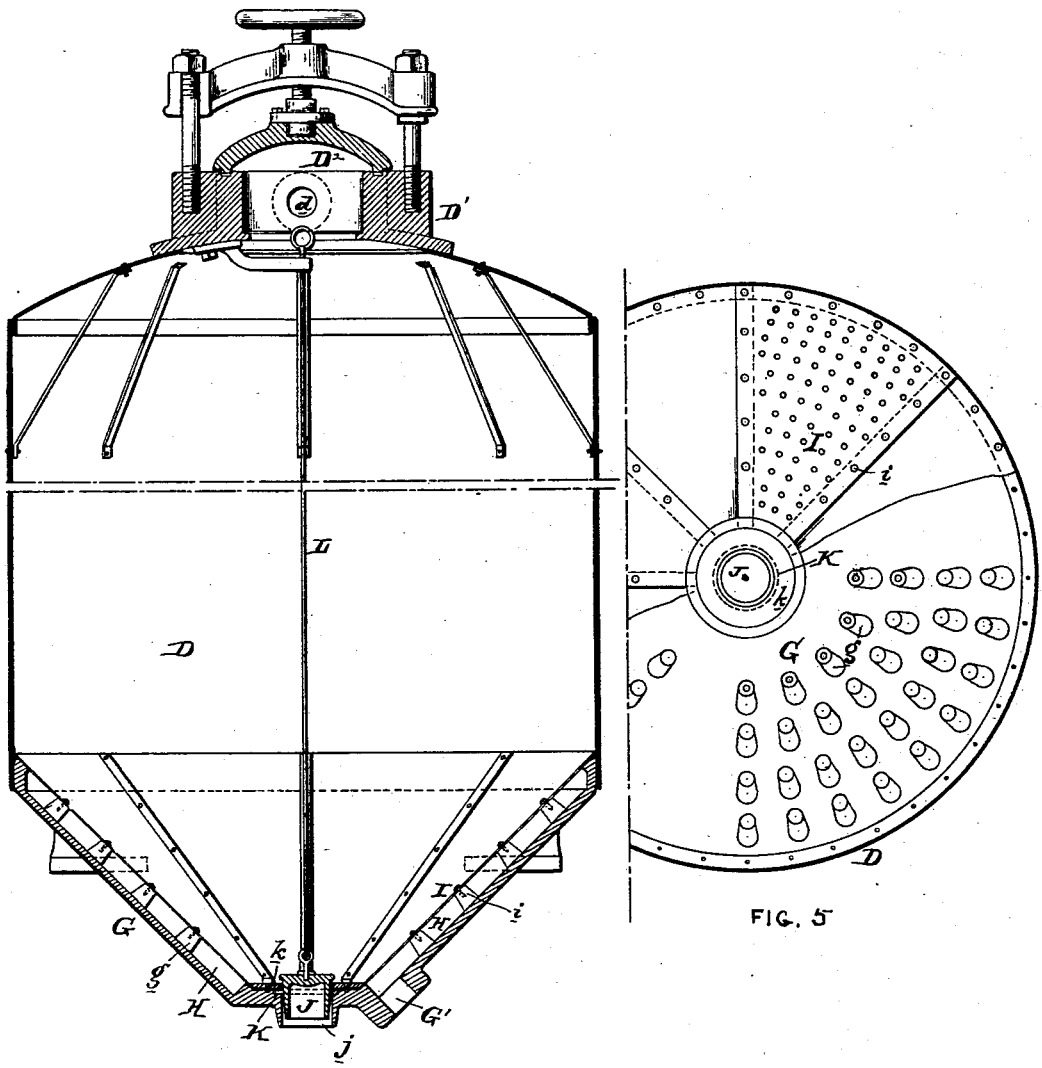

UNITED STATES PATENT OFFICE.

LEWIS D. ARMSTRONG, OF LOCK HAVEN, PENNSYLVANIA; MYLERT M. ARMSTRONG, ADMINISTRATOR OF SAID LEWIS D. ARMSTRONG, DECEASED, ASSIGNOR TO THE NEW YORK AND PENNSYLVANIA COMPANY, OF PENNSYLVANIA.

APPARATUS FOR LEACHING.

SPECIFICATION forming part of Letters Patent No. 570,861, dated November 3, 1896.

Application filed June 25, 1891. Serial No. 397,411. (No model.)

*To all whom it may concern:*

Be it known that I, LEWIS D. ARMSTRONG, of Lock Haven, in the county of Clinton and State of Pennsylvania, have invented an Improvement in Apparatus for Leaching, of which the following is a specification.

My invention has reference to apparatus for leaching; and it consists of certain improvements which are fully set forth in the following specification and shown in the accompanying drawings, which form a part thereof.

My invention has reference particularly to apparatus for leaching black ash.

In carrying out my invention I provide a a series of leaching-tanks made liquid-tight, and combined with them is a receiver or tank so designed that the black ash which is to be leached may be discharged from the said receiver into either one of the series of leaching-tanks, whereby they may be successively charged. After the black ash is placed in the leaching-tanks the tanks are sealed and water is run into the tank which was first to be charged, preferably under pressure, and thence through the next tank of the series to be charged, and so on until it finally emerges from the tank which was last to be charged. After this operation has been carried on for a given time the black ash in the tank which was first charged has had the soda or alkaline constituents dissolved out, leaving in the tank the residue or black-ash waste, which is composed of the insoluble constituents. This residue is then discharged, and simultaneously or thereabout with this discharge an additional tank of the series is charged with fresh black ash and the operation of leaching takes place once more. From this it will be observed that the water which passes into the first tank is caused to treat black ash in a condition in which the greater part of the soda or alkaline constituents has been dissolved out, and the soda solution so formed is caused to treat the black ash in the next tank, which is in a stronger condition than the dissolving or leaching solution. This action reduces the strength of the solution in the second tank by dissolving a portion of the soluble soda constituents, which pass off with the leaching solution of soda and strengthen its alkaline properties. This strengthened alkaline or leaching solution passes from the second tank to the third tank of the series, and so on, becoming stronger each time, and is finally discharged from the last tank of the series. The flow of the leaching solution through each successive tank increases the density and strength of the solution, until at the final end of the series the said solution is of a uniform or practically uniform strength. This soda solution is then causticized in the ordinary way. It will be seen that in this manner each of the charges of black ash is subjected to a series of washings, each washing being with a solution of carbonated soda liquor of different strengths, increasing gradually from the time it enters the first tank to the time it leaves the last tank.

The apparatus for carrying out my improved method will be understood from the accompanying drawings, in which—

Figure 2:
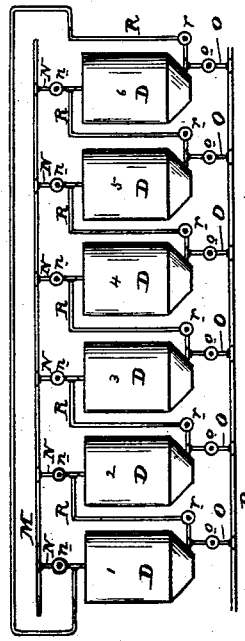
Figure 3:
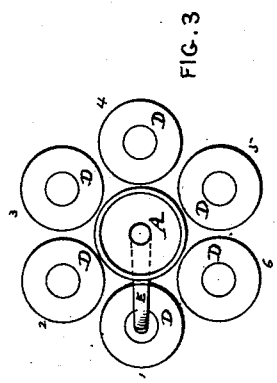

Figure 1 is a side elevation of apparatus for carrying on my improved leaching process. Fig. 2 is a diagram illustrating the leaching-tanks spread out in a row, showing the connection of the pipes and valves. Fig. 3 is a plan view showing the arrangement of the leaching-tanks and receiver. Fig. 4 is a vertical section of one of the leaching-tanks, and Fig. 5 is a plan view of the interior of the bottom of same with part of the perforated plates of the bottom removed.

A is the receiving tank or vessel, which is supported at an elevation. Into this receiving tank or vessel the black ash is introduced in any convenient manner. This vessel or receiver is preferably formed with a conical bottom and has a charging capacity several times the capacity of one of the leaching-tanks D. The leaching-tanks D are all similar and are preferably arranged in a circle, as indicated in Figs. 1 and 3, in practice there being preferably six or more tanks. The leaching-tanks D are provided with removable liquid-tight covers or lids D² at their tops, through which the black ash is discharged from a nozzle E. The nozzle E is connected to the bottom of the receiving tank or vessel A and is free to be swung about its connection with said tank as an axis, so as to be brought over the openings in the tops of either one of the series of leaching-tanks. The valve F is employed to control the discharge of the black ash from the receiving-tank A. The tank A is centrally located with respect to the leaching-tanks D, as clearly illustrated in the small view, Fig. 3, so that any one of the series of leaching-tanks may be charged with equal facility. The leaching-tanks are more clearly shown in Figs. 4 and 5, from which it will be observed that the tanks consist of sides and top formed of sheet-iron, suitably braced, and a bottom formed conical in shape and of cast-iron and terminating in a discharge-aperture $j$, sealed by a valve J, which fits an annular seat of rubber K, held in place by a clamping annular plate $k$. The inner surface of these castings G is provided with a large number of projections $g$, upon which perforated plates I are placed and secured by screws or rivets $i$. The liquid which passes through the perforated plates enters the annular conical chamber H and emerges from the liquid-discharge openings G'. The liquid enters the top of the leaching-tank by an aperture $d$, formed in the side of the head D', upon which the valve or lid D² is seated.

Water is supplied from a water-main M, having a controlling-valve $m$, to either one of the series of leaching-tanks by means of independent pipes N, having valves $n$, connecting with the apertures $d$ of the respective tanks. The liquid may be discharged from any one of the series of leaching-tanks by means of a main P, connecting with the respective leaching-tanks by means of independent pipes O, having valves $o$ and fitted to the discharge-apertures G'. In addition to these fluid-pipes the pipe O, adjacent to the discharge-opening G' of one tank, is connected with the pipe N, adjacent to the aperture $d$ of the next or adjacent tank, by means of a pipe R, having a valve $r$. By the proper manipulation of the valves $n$ or $r$ the water may be caused to flow from the main M through the tank 1, and from it through tank 2, and so on, until it passes through the last tank of the series, and then discharges by the pipe P, which may be provided, if desired, with a valve $p$. If the tank 1 has been fully leached, the tank-waste is discharged into a spout S by raising valve J and from it received into a car T, by which it may be conveyed wherever desired. The spout S is free to swing about a central support $s$, so that it may be brought under the discharge-openings $j$ of any one of the series of tanks. The pipes E and S should be of sufficient diameter and inclination to prevent clogging.

If the tank 1 is now refilled with black ash, the water is first run into the tank 2, and from tank 2 the solution passes through tank 3, and so on, and then from tank 6 through tank 1 and discharges by the pipe P, as before. When the alkaline substances are fully leached from the tank 2, the contents are discharged and the last operation repeated, but in this case the water is first fed to tank 3 and finally discharged from tank 2.

I have assumed in this description that all of the tanks are kept full of material during the leaching process, but in practice one or two of the tanks are at all times out of the liquid circulation for the purpose of leisurely charging and discharging. However, the process is the same with four tanks as it is with six, that is to say, the tank which is last discharged is the tank through which the liquid passes last before being discharged and the tank through which the liquid passes first is the tank which is first to be discharged in the series under treatment with the liquid.

After the tanks have been charged with the black ash the lids are fitted tightly upon the heads D', so as to make the tanks liquid-tight as they are held filled with water or fluid during the leaching process. When the tank is ready for discharging, the lid D² is removed and the rod L raised and with it the valve J, so that the charcoal or carbon may slide down the conical bottom and pass into the car T, waiting to receive it.

I do not limit myself to any number of leaching-tanks, nor to any number of leaching operations before the final discharge of the material, and, broadly considered, my improved leaching apparatus is applicable to the treatment of various substances besides black ash, though it is excellently adapted for that particular purpose.

In place of arranging the tanks in a circle, so that the receiving vessel may be centrally located above them, they may be arranged in a semicircle or in a straight line, though this is not as desirable as the particular arrangement set out in this specification.

Having now described my invention, what I claim as new, and desire to secure by Letters Patent, is—

1. In apparatus for leaching, the combination of a large elevated receiving tank or vessel, a series of leaching-tanks arranged at a lower elevation than the receiving-tank provided at the top with removable covers for charging, and valves at the bottom for discharging, means for delivering the material from the receiving-tank to either one of the series of leaching-tanks, pipes for supplying leaching liquid to the tanks and the independent swiveled discharge-pipe S located below the tanks and having its receiving end adapted to be brought under the discharge-outlet of any one of them.

2. In a leaching apparatus the combination of a series of leaching-tanks having removable covers at the top and discharge-valves at the botton, a liquid-supply main M having valved branches N at the top of each of the tanks for supplying liquid to any tank of the series, the discharge-main P having valved branches O leading to the bottom of each of the tanks, the valved pipes R connecting the valved branch N of each tank with the valved branch O of the next tank, an elevated tank or vessel above the series of leaching-tanks, and means for delivering the material from the elevated tank to any one of the leaching-tanks of the series.

In testimony of which invention I have hereunto set my hand.

LEWIS D. ARMSTRONG.

Witnesses:
R. F. HUDSON,
H. A. DARRATT.